Dec. 14, 1971    C. K. HULEN    3,626,595
HOLDER FOR A SCRIBING TOOL AND SURFACE MARKING SYSTEM
Filed Jan. 2, 1970    2 Sheets-Sheet 1
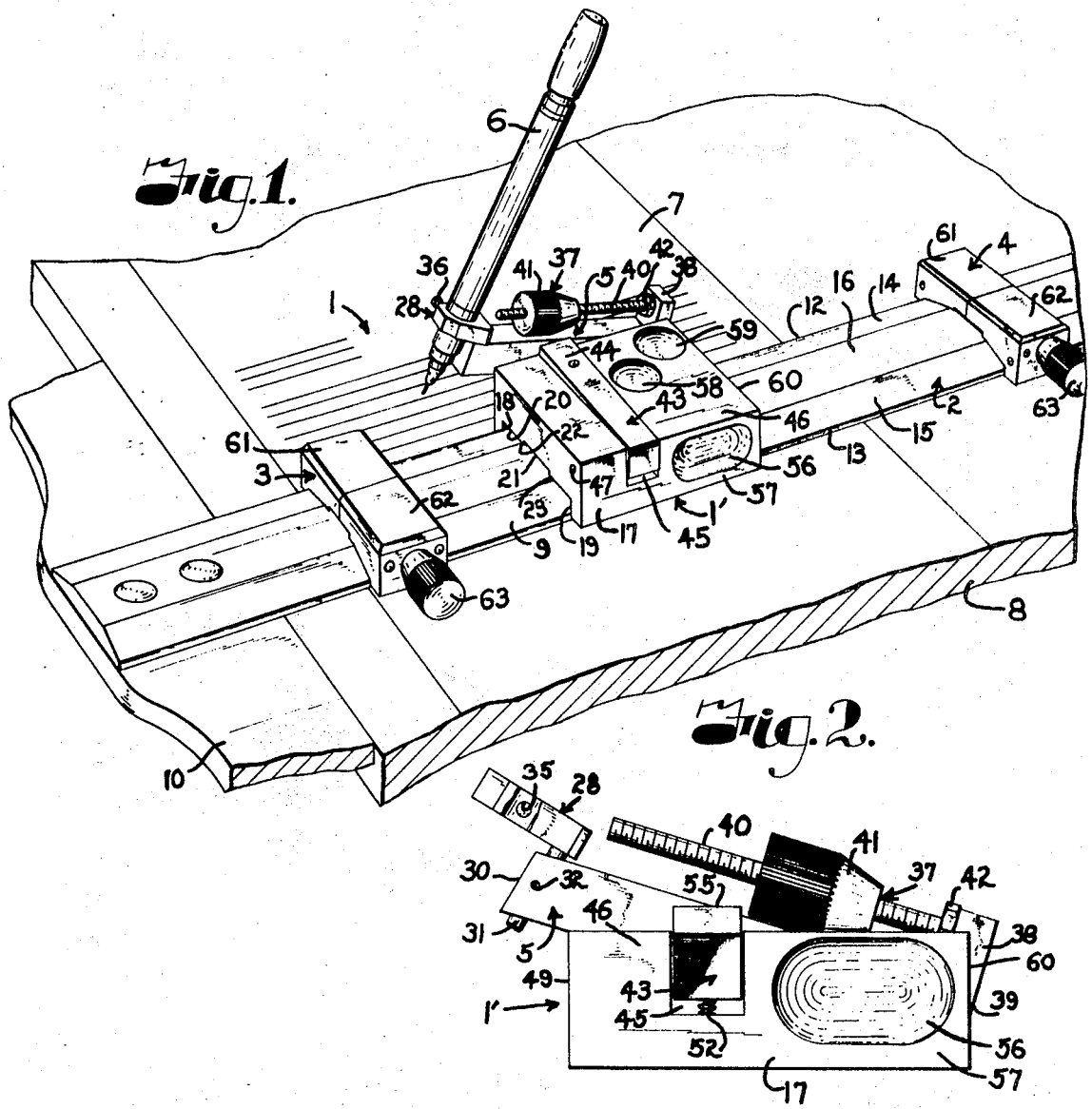
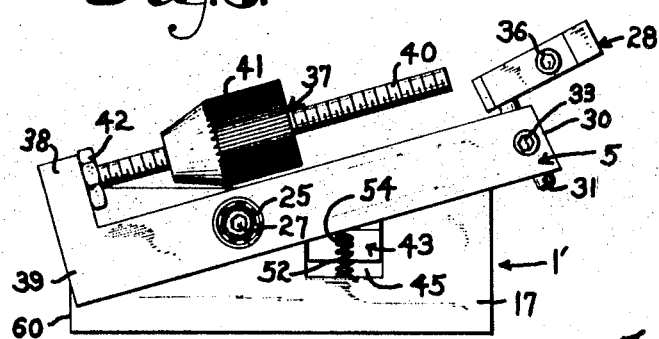
INVENTOR.
Claude K. Hulen
BY
Fishburn Gold & Litman
ATTORNEYS

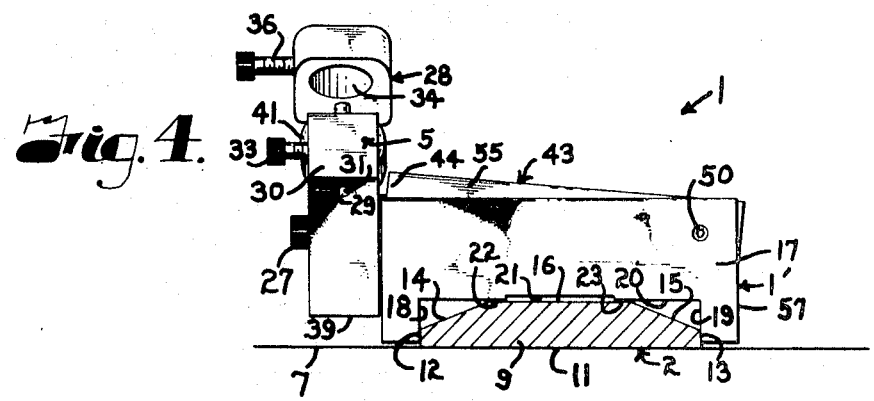
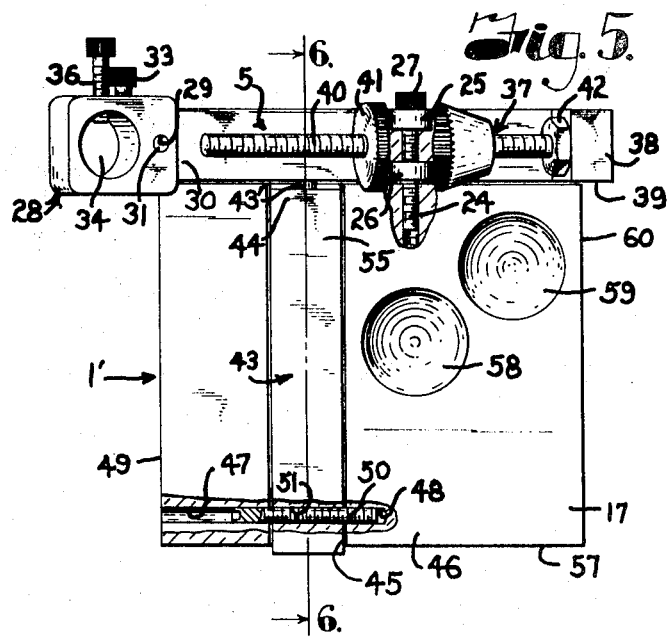
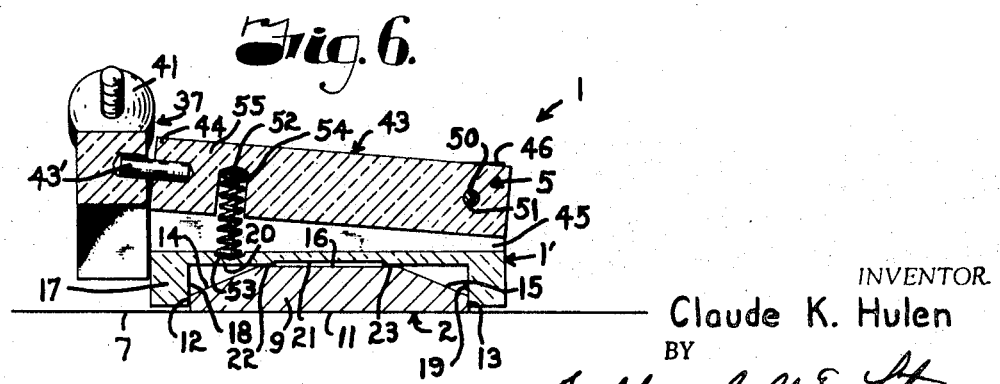

United States Patent Office 3,626,595
Patented Dec. 14, 1971

3,626,595
HOLDER FOR A SCRIBING TOOL AND SURFACE MARKING SYSTEM
Claude K. Hulen, 1524 Charlotte,
Kansas City, Mo. 64108
Filed Jan. 2, 1970, Ser. No. 139
Int. Cl. B43l 13/00
U.S. Cl. 33—32 B                                6 Claims

ABSTRACT OF THE DISCLOSURE

A surface marking system including a slide member movable along an elongate straight edge between stop members mounted thereon to define limits of travel of the slide member and means for movably mounting a scribing tool on the slide member for selectively moving the scribing tool into and out of engagement with a surface to be marked wherein a scribing tool holder has a slide member shaped to engage and slide along the straight edge member and a lever is pivotally mounted on the slide member with a member for holding the scribing tool mounted on one end of the lever whereby the scribing tool mounted in the holding member may be selectively moved into and out of engagement with the surface to be marked. The slide member has a second lever pivotally mounted thereon and extending transverse to the first named lever and having one end connected thereto. A spring engages the second lever and the slide member for urging the scribing tool out of engagement with the surface to be marked. The slide member has a plurality of recesses in the exterior surface thereof positioned to receive thumb and fingers of a hand of a person using the scribing tool holder whereby one finger is free to selectively depress the second lever to move the scribing tool into engagement with the surface to be marked.

---

The present invention relates to a holder for a scribing tool and more particularly to a surface marking system including a scribing tool holder wherein the scribing tool may be selectively moved into and out of engagement with a surface to be marked as the holder is moved along a guide member between spaced stop members mounted thereon.

The principal objects of the present invention are: to provide a surface marking system including a scribing tool and holder therefor movably mounted on a slide member movable along an elongate guide member between stop members selectively positioned thereon wherein the scribing tool may be selectively moved into and out of engagement with a surface to be marked during movement of the slide member along the guide member; to provide such a surface marking system wherein the scribing tool is normally positioned out of engagement with the surface to be marked; to provide such a surface marking system wherein the scribing tool holder has adjustable counterweight means mounted thereon whereby adjustment of the counterweight means is operative to vary the pressure necessary to move the scribing tool into engagement with the surface to be marked; to provide such a scribing tool holder having depending flanges spaced to engage a guiding edge and a trailing edge of the guide member and having a plurality of recesses in exterior surface thereof positioned to receive thumb and fingers of one hand of a person using the scribing tool holder whereby one finger is free to selectively move the scribing tool into and out of engagement with the surface to be marked; and to provide such a scribing tool holder which is economical to manufacture, sturdy and durable in construction, simple in operation, and particularly well suited for the proposed use.

Other objects and advantages of this invention will become apparent from the following description taken in connection with the accompanying drawings wherein are set forth by way of illustration and example certain embodiments of this invention.

FIG. 1 is a perspective view of a scribing tool holder embodying features of the present invention showing the scribing tool holder mounted on a guide member and movable between adjustable stop members.

FIG. 2 is a side elevational view of one side of the scribing tool holder.

FIG. 3 is a side elevational view of the other side of the scribing tool holder.

FIG. 4 is an end elevational view of the scribing tool holder mounted on the guide member.

FIG. 5 is a plan view of the scribing tool holder.

FIG. 6 is a transverse sectional view through the scribing tool holder taken on line 6—6, FIG. 5 showing the structure for moving a scribing tool into and out of engagement with a surface to be marked.

Referring more in detail to the drawings:

The reference numeral 1 generally designates surface marking system having a scribing tool holder 1' adapted for movement along a guide member 2 between a pair of spaced stop or abutment members 3 and 4 adjustably mounted on the guide member 2. The scribing tool holder 1' and the guide member 2 have cooperating engaging surfaces for supporting and guiding the scribing tool holder 1' during movement along the guide member 2. The scribing tool holder 1' has a lever 5 pivotally mounted thereon and adapted to hold a scribing tool 6 for moving the scribing tool 6 into and out of engagement with a surface to be marked, such as a piece of drafting cloth or paper 7 suitably secured to a desk or table 8.

The guide member 2 is illustrated as a T-square having an elongate blade portion 9 for movement over the drafting cloth or paper 7 and the desk or table 8 and a head portion 10 adapted for moving along an edge of the desk or table 8. The blade portion 9 has a planar lower surface 11 and substantially parallel longitudinally extending laterally spaced guiding and trailing edges 12 and 13 respectively extending normal or perpendicular to the planar lower surface 11. Inclined upper surfaces 14 and 15 extend upwardly from the guiding edge 12 and the trailing edge 13 respectively and the inclined upper surfaces 14 and 15 have their upper edges terminating at a planar upper surface 16.

The cooperating surfaces of the scribing tool holder 1' engage the guiding and trailing edges 12 and 13 and the planar upper surface 16. In the illustrated structure, the scribing tool holder 1' has an elongate generally planar slide or body member 17 having depending flanges 18 and 19 spaced to engage the guiding and trailing edges 12 and 13 respectively of the blade portion 9 of the guide member 2. The slide or body member 17 has a lower surface 20 extending between the flanges 18 and 19. A recess 21 is centered in the lower surface 20 and extends upwardly therefrom to relieve the lower surface 20 whereby the lower surface 20 of the slide or body member 17 will engage the upper surface 16 of the guide member 2 at two points 22 and 23 adjacent the inclined upper surfaces 14 and 15 respectively. The recess 21 in the lower surface 20 of the blade portion 9 is operative to prevent uneven movement of the scribing tool holder 1' along the guide member 2, such as may be caused by uneven portions on the upper surface 16 of the blade portion 2 or on the lower surface 20 of the slide or body member 17 of the scribing tool holder 1'.

The scribing tool holder 1' is illustrated as having the lever 5 pivotally mounted adjacent an exterior surface 23 at one side of the slide or body member 17 having one of the flanges, for example flange 18, depending therefrom for movement susbtantially parallel thereto. The lever 5 is an elongate member having a pin 24 extending transversely therethrough and into the slide or body member 17 adjacent the flange 18. The pin 24 is illustrated as an elongate threaded shaft received within a threaded bore in the slide or body member 17. The lever 5 has a bore extending therethrough for the pin 24 and opposite sides of the lever 5 have counterbores therein to receive suitable bearings, such as ball bearings 25 and 26 respectively whereby the lever 5 will pivot easily about the pin 24. A suitable fastening device, such as a head of a screw or a nut 27, is mounted on the free end of the pin 24 and the screw head or nut 27 is moved to engage the bearing in the exterior counterbore.

The lever 5 has a holding member 28 for holding the scribing tool 6 adjustably mounted on one end of the lever 5 whereby the scribing tool 6 may be selectively moved into and out of engagement with the surface of the drafting cloth or paper 7. In the illustrated structure, the lever 5 is pivotally mounted adjacent a rear end thereof and an inclined bore 29 extends through a forward end 30 of the lever 5 between an upper and lower surface thereof to receive a shaft 31 extending from the scribe holding member 28. A threaded bore 32 extends through the forward end 30 of the lever 5 and is substantially normal or perpendicular to the bore 29 and the threaded bore 32 is adapted to receive a suitable fastening member, such as a screw 33, whereby the screw 33 is adapted to engage the shaft 31 to position the scribe holding member 28.

The scribe holding member 28 is illustrated as a generally planar member having an aperture 34 therethrough to receive the scribing tool 6. The scribe holding member 28 has a threaded bore 35 extending preferably radially and perpendicular to the axis of the aperture 34 whereby a suitable fastening device, such as a screw 36, may be moved into engagement with an exterior surface of the scribing tool 6 to secure same within the aperture 34.

It is desirable to provide suitable resilient means, as later described, for urging the scribing tool 6 mounted in the holding member 28 out of engagement with the surface of the drafting cloth or paper 7. It is, therefore, necessary to overcome the resilient means to move the scribing tool 6 into engagement with the surface of the drafting cloth or paper 7.

It is preferable to have adjustable or movable counterweight means 37 to selectively vary the pressure necessary to overcome the resilient means to move the scribing tool 6 into engagement with the drafting cloth or paper 7. In the illustrated structure, the counterweight means 37 are mounted on the lever 5 wherein a standard 38 is mounted on or integral with the lever 5 at a rear end 39 thereof and extends upwardly from an upper surface of the lever 5. An elongate threaded shaft 40 is mounted in a threaded bore in the standard 38 and extends from the standard 38 in a position above and substantially parallel with the upper surface of the lever 5. A weight 41 has an internally threaded bore (not shown) extending therethrough for mounting on and movement along the threaded shaft 40.

A suitable fastening member, such as a nut 42, is mounted on the threaded shaft 40 adjacent the standard 38 to secure the shaft 40 against turning when the weight 41 is moved along the shaft 40 to prevent removal of the shaft 40 from the standard 38.

A lever 43 is pivotally mounted on the slide or body member 17 and extends transversely to the lever 5 and has one end 44 connected thereto, as by a pin 43', whereby movement of the lever 43 is operative to raise and lower the lever 5. In the illustrated structure, the slide or body member 17 has an elongate slot or trough 45 in an upper surface 46 with the trough or slot 45 extending transversely to the lever 5 for movement of the lever 43 therein. The pivotal mounting of the lever 43 is illustrated as a pair of bores 47 and 48 extending transversely to the trough or slot 45 with one of the bores, for example bore 47, extending between a forward end 49 of the slide or body member 17 and a forward wall of the slot or trough 45. The other bore 48 is aligned with the bore 47 and extends rearwardly from the rear wall of the slot or trough 45. The bores 47 and 48 may be threaded to receive a suitable shaft 50 therein and the lever 43 has a bore 51 for the shaft 50 to extend through. The bore 51 may have suitable counterbores (not shown) for the mounting of bearings at opposite sides of the lever 43.

The slot 45 is sized to guide the lever 43 in a substantially vertical path during movement thereof by the resilient means or by one finger or a hand of the person using the scribing tool holder 1' to thereby move the lever 5 and scribing tool 6 in a vertical path substantially parallel with the surface 23. In the illustrated embodiment, the resilient means for urging the scribing tool 6 out of engagement with the drafting cloth or paper 7 engages the lever 43 and the slide or body member 17 to urge the lever 43 upwardly within the trough or slot 45. The resilient means is illustrated as a helical spring 52 having one end received within an annular recess 53 in a lower surface of the slot or trough 45 and an upper end received within an annular recess 54 in a lower surface of the lever 43 to thereby urge the lever 43 upwardly to move the lever 5 and a scribing tool 6 mounted in the scribe holding member 28 out of engagement with the drafting cloth or paper 7. The spring 52 urges a major portion of an upper surface 55 of the lever 43 above the upper surface 46 of the slide or body member 17 whereby the upper surface 55 of the lever 43 is positioned to be engaged by a person using the scribing tool holder 1', as later described.

The slide or body member 17 has a plurality of recesses in the exterior surface thereof positioned to receive fingers of a hand of a person using the scribing tool holder 1'. The recesses are positioned to receive a thumb and selected fingers of a hand of a person using the scribing tool holder 1' whereby one finger is free to selectively depress the lever 43 to move the scribing tool 6 into and out of engagement with the drafting cloth or paper 7.

In the illustrated structure, an elongate recess 56 is positioned in an exterior surface 57 at the side of the slide or body member 17 having the flange 19 to receive the thumb of a person using the scribing tool holder 1' and a pair of annular recesses 58 and 59 are positioned in the upper surface 46 of the slide or body member 17 and are positioned between the slot or trough 45 and a rear end 60 of the slide or body member 17 to receive the middle finger and the ring finger respectively of one hand of a person using the slide or body member 17 thereby leaving the index finger free to selectively control the lever 43 to move the scribing tool 6 into and out of engagement with the drafting cloth or paper 7.

The stop members 3 and 4 are selectively positioned on the blade portion 9 of the guide member 2 to define the limits of travel of the slide or body member 17 and thereby the limits of travel of the scribing tool 6. In the illustrated structure, the stop members 3 and 4 have a cross-section similar to the slide or body member 17 to engage the edges 12 and 13 and the upper surface 16 of the blade portion 9 and the stop members 3 and 4 are each formed of portions 61 and 62 which may be tightened onto the blade portion 9, as by a fastening screw 63 extending through one portion into the other portion of the stop members.

In using the surface marking system 1, the drafting cloth or paper 7 is suitably secured in a desired position on the desk or table 8 and the stop members 3 and 4 are positioned along the blade portion 9 of the guide member 2 and secured thereto to define the limits of travel of the slide or body member 17 along the blade portion 9. The scribing tool 6 is positioned in the scribe holding member 28 and the screws 33 and 36 are tightened to engage the shaft 31 and the scribing tool 6 respectively. The weight 41 is positioned along the threaded shaft 40 to provide the desired resistance of the spring 52. The slide or body member 17 is then positioned on the blade portion 9 of the guide member 2 between the stop members 3 and 4 with the interior or facing surfaces of the flanges 18 and 19 cooperatively engaging the guiding and trailing edges 12 and 13 respectively of the blade portion 9. The thumb and fingers of the hand of the person using the scribing tool holder 1' are positioned in the recesses 56, 58 and 59. One finger, preferably the index finger, of the person using the scribing tool holder 1' selectively depresses the lever 43 to move the scribing tool 6 into engagement with the surface of the drafting cloth or paper 7 and allows the spring 52 to raise the lever 43 to move the scribing tool 6 out of engagement with the surface of the drafting cloth or paper 7. The guide member 2 may be moved over the surface of the desk or table 8 in any conventional manner to position the scribing tool 6 in a selected position relative to the surface of the drafting cloth or paper 7.

It is to be understood that while I have illustrated and described one form of my invention, it is not to be limited to the specific form or arrangement of parts herein described and shown.

What is claimed is:

1. A surface marking system for precision making of straight lines comprising:
   (a) an elongate guide member movable over a surface to be marked and having opposed parallel guiding surfaces extending longitudinally thereof, said guide member having generally upwardly facing supporting surfaces;
   (b) a slide member having a bottom surface with portions engaging the generally upwardly facing supporting surfaces of the guide member, said slide member having downwardly extending flanges with inwardly facing surfaces slidably engaging the opposed parallel guiding surfaces of the guide member whereby said slide member is supported and guided by the guide member and is liftable therefrom for disengagement;
   (c) a lever member pivotally mounted on the slide member and extending substantially thereacross transversely of the guide member, the pivot of the lever member having an axis parallel and longitudinally of the guide member and being located adjacent one side of said slide member, said lever member having a free end adjacent the other side of the said slide member;
   (d) resilient means engaging the slide member and lever member and urging said other end of the lever member upwardly of the slide member;
   (e) an arm pivotally mounted on the slide member and extending longitudinally of the guide member, said arm having a free end;
   (f) means connecting the free end of the lever member with the arm between the pivotal mounting and free end thereof whereby the resilient means raises the free end of said arm;
   (g) a scribing tool mounted adjacent the free end of said arm and having an end adapted to engage a surface on downward movement of said arm.

2. A surface marking system as set forth in claim 1:
   (a) said pivotal mounting of said arm is a shaft having a portion extending from said other side of said slide member and anti-friction bearings in the arm arranged on said shaft whereby the pivotal axis of the arm is perpendicular to the pivotal axis of the lever member.

3. A surface marking system as set forth in claim 1, and including:
   (a) counterweight means mounted on said arm and selectively movable longitudinally thereof to vary the spacing of the counterweight and the pivotal axis of the arm to selectively vary the pressure necessary to overcome said resilient means to move said scribing tool into engagement with said surface to be marked.

4. A surface marking system as set forth in claim 3, wherein:
   (a) a shaft is mounted on said arm, said shaft being spaced from and substantially parallel with said arm;
   (b) said counterweight being selectively movable along said shaft to vary the pressure necessary to overcome said resilient means.

5. A surface marking system as set forth in claim 1, wherein:
   (a) said slide member has an elongate slot extending transversely thereof substantially perpendicular to the guiding surfaces on the guide member, said slot having parallel sides with a spacing slightly greater than the width of the lever member;
   (b) the pivotal mounting of the lever member being a shaft mounted in the slide member and extending across the slot adjacent one end thereof whereby the lever member is operable in said slot;
   (c) said connection between the free end of the lever member and the arm being a pin mounted in said lever member and extending therefrom and said arm having a recess extending therein from a side adjacent the lever for receiving said pin.

6. A surface marking system as set forth in claim 5 and including:
   (a) finger and thumb receiving recesses in said one side and top of the slide member to facilitate gripping the slide member for movement along the guide member while permitting an operator's finger to depress the lever member lowering the arm and scribing tool to engage the surface to be marked.

References Cited
UNITED STATES PATENTS

| | | | |
|---|---|---|---|
| 474,773 | 5/1892 | Eickershoff et al. | 33—32 E |
| 977,829 | 12/1910 | Ourdan | 33—32 C |
| 1,059,040 | 4/1913 | Craft et al. | 33—34 |
| 1,356,796 | 10/1920 | Sommer et al. | 33—26 |
| 2,058,091 | 10/1936 | Marsella et al. | 33—32 C |
| 3,242,574 | 3/1966 | Salas | 33—32 B |

HARRY N. HAROIAN, Primary Examiner

U.S. Cl. X.R.

33—42